United States Patent Office 3,646,017
Patented Feb. 29, 1972

3,646,017
PROCESS FOR PRODUCING POLYMETHINE DYES
Walter F. Hoffstadt, Vestal, N.Y., assignor to
GAF Corporation, New York, N.Y.
No Drawing. Filed May 7, 1969, Ser. No. 822,737
Int. Cl. C09b 23/00
U.S. Cl. 260—240.1       9 Claims

ABSTRACT OF THE DISCLOSURE

An improved process for the producing of sensitizing dyes, e.g., carbocyanine, merocyanine, chain-substituted carbocyanines and methylene chain-substituted polycarbocyanine and merocyanine dyes, etc., wherein an active methylene-containing compound is reacted with an ammonium compound containing an N-vinyl or N-polyvinyl or N-methylene or N-phenyl-urethane group. Alternatively, such process is conducted by reacting the active methylene group containing compounds with an in situ or a preformed intermediate produced by the reaction of ethyl chloroformate and an anilinovinyl, polyvinyl or methylene quaternary ammonium compound.

The present invention is directed to a novel process of producing dyes, i.e. cyanine dyes; more particularly, the process of the present invention is directed to an improved process for producing such dyes through the employment of an N-phenyl-N-vinyl urethane intermediate compound or its analogues.

Cyanine dyes are well known as optical sensitizers for silver halide emulsions, photo-conducting compositions, and similar materials. Generally, such cyanine dyes, including carbocyanine dyes, merocyanine dyes and chain-substituted cyanine dyes have been prepared by the reaction of two intermediates, which during the course of the reaction result in the elimination of simple molecules such as mercaptans, alcohols, water, acids, aniline or acylanilide.

One of the intermediates generally employed in the production of the optical sensitizing cyanine dyes is a compound containing an active methyl group which reacts through the formation of a methylene base as follows:

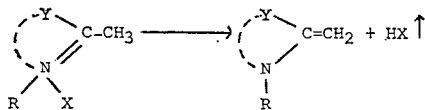

The othe rreactant in the production of the optical sensitizing cyanine dyes can be a nitrogenous quaternary ammonium salt which contains a proton seeking atom or group in th δ or γ position relative to the nitrogen of a nitrogenous hetero nucleus through a vinyl or polyvinyl or methylenic linkage. This type of reactant is exemplified by the following structure:

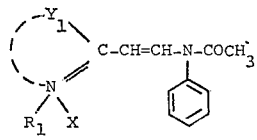

In the production of cyanine dye the reactant containing the active methylene group reacts with the quaternary salt in the following illustrative manner:

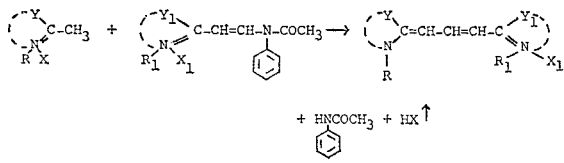

As seen from the above, this typically exemplified reaction to produce optical sensitizing cyanine dyes produces a cyanine dye with accompanying elimination of acetanilide.

In the above reaction, Y and $Y_1$, which may be the same or different, are selected from O, N, C, S, Se atoms, the group of atoms necessary to complete the heterocyclic ring structure of the types previously known to be used in the synthesis of cyanine dyes, particularly those used for the optical sensitization of photographic silver halide emulsions; and $X_1$, which may be the same or different, are anions such as alkyl sulfate, chlorine, bromine, iodine, sulfate, perchlorate, benzenesulfonate, p-toluenesulfonate and other substituted phenyl sulfonates, etc.; R and $R_1$, which may be the same or different, are lower alkyl groups, e.g., methyl, ethyl, n-propyl, isopropyl and the like; substituted alkyl group, e.g., hydroxymethyl, hydroxyethyl, hydroxypropyl; carboalkyl, e.g., carboxymethyl, carboxyethyl, carboxypropyl; allyl; benzyl, phenethyl or other aralkyl groups or hetero alkyl groups.

The above-cited general reaction employed in the production of various cyanine dyes permits the production of the cyanine dyes in yield acceptable for many purposes. However, when it is desired to use the dyes in pure form for their optically sensitizing properties, particularly as optical sensitizers in silver halide emulsions, the yields of pure dye obtained by following the above general reaction are often objectionably low. Depending upon the degree of the reactivity of the various intermediates employed, i.e., the active methyl group contained on the quaternary ammonium salt intermediates, side reactions due to fragmentation, multiple condensation or decomposition of the reactant tend to produce low yields of low purity products. As indicated above, such procedures become objectionable because any dyes intended for use as photographic sensitizers require extensive purification to make them photographically acceptable.

For this reason, it has long been the desired of the industry to provide a simple and efficient method of producing such cyanine sensitizing dyes in a manner which eliminates the inherent deficiencies and disadvantages of the procedures described by the prior art.

Accordingly, it is a principal object of the present invention to provide a method of preparing cyanine dyes and optical sensitizing polymethine cyanine dyes for silver halide emulsions in particular wherein such process reduces radically the inherent deficiencies and disadvantages of the prior art processes.

It is another object of the present invention to provide an improved process for the production of cyanine dyes eliminating the deficiencies and disadvantages of side reactions due to fragmentation, multiple condensation or decomposition of reactants.

Still further objects will be apparent from the following descriptions.

These objects are accomplished by the use of ethyl chloroformate as a reagent in the dye condensations of anilinovinyl, polyvinyl or methylene intermediates with compounds containing active methyl and methylene groups whereby in the formation of the desired cyanine, merocyanine or oxonol dyes, a phenyl urethane group is eliminated.

I have found that cyanine dyes in general including those known to be used for the optical sensitization of silver halide emulsions, etc., can be advantageously prepared in a manner essentially free from the objectionable side reactions due to fragmentation, multiple condensation or decomposition, etc., by employing in lieu of the conventional acylaniliovinyl, polyvinyl or methylene, e.g., acetanilovinyl, polyvinyl or methylene moiety generally employed in the production of such cyanine dyes by reaction with the active methyl or active methylene containing compound, a compound containing an N-phenyl-N-vinyl polyvinyl or methylene urethane grouping.

The advantageous results associated with the process of the present invention in eliminating the inherent deficiencies and disadvantages of the prior art can also be obtained by the in situ formation of the N-phenyl-N-vinyl polyvinyl or methylene urethane structure through the reaction of ethyl chloroformate with a compound containing an anilinovinyl polyvinyl or methylene function or its analogues.

Accordingly, the procedure of the present invention comprises an improved process for the production of cyanine-like dyes, such improvement relating for example to the employment of various heterocyclic nitrogeneous quaternary ammonium N-phenyl-N-vinyl urethanes, either pre-formed or prepared in situ as intermediates for the preparation of such dyes by the reaction with compounds containing active methyl or methylene groups.

In more detail, the objects and advantages of the improved process of the present invention are achieved through the utilization of a reactant in the production of cyanine-like dyes comprising a heterocyclic quaternary ammonium or ketomethylene compound containing an N-phenyl-N-vinyl urethane structure. Thus, in the production of carbocyanine dyes, chain-substituted carbocyanine dyes, merocyanines, and chain-substituted polycarbocyanine dyes in accordance with the improved process of the present invention quaternary ammonium salts of the following formula are employed:

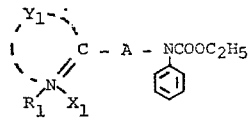

wherein $R_1$ represents an alkyl, allyl, hydroxyalkyl, alkoxyalkyl, carboxyalkyl, carboxyalkoxy or aralkyl; group; —A— is a polyvinyl chain of from 1 to 3 vinyl units which may be unsubstituted or substituted by alkyl or aryl, e.g., phenyl, oxyphenyl, thiophenyl and is characterized by the structural formula:

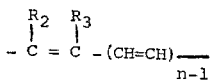

wherein $R_2$ and $R_3$ are hydrogen, lower alkyl, aryl, aryloxy and arylthio; $n$ is 1, 2, or 3, at least one of $R_2$ and $R_3$ being hydrogen, $R_3$ always being hydrogen when $n$ is 2 or 3; $X_1$ is selected from halide, e.g., bromide and iodide, perchorate, sulfate, alkyl sulfate, e.g., methyl sulfate, ethyl sulfate; e.g., benzene sulfonate; sulfo alkyl, e.g., sulfo propyl: substituted phenyl sulfonate, e.g., p-toluenesulfonate and the like; $Y_1$ represents the non-metallic atoms necessary to form a 5- or 6-membered heterocyclic ring system of the type commonly known in cyanine dyes or fused ring derivative thereof; and $n$ is an integer of 1 to 3.

In the preparation of merocyanine or oxonol dyes in accordance with the improved process of the present invention an alkene urethane reactant corresponding to the following general formula may be employed:

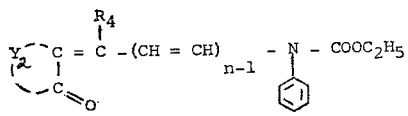

$Y_2$ represents the atoms necessary to complete a heterocyclic nucleus including one which contains the group $R_5$ as part of the nucleus wherein $R_4$ is selected from hydrogen, lower carboxyalkyl, hydroxyalkyl and alkoxyalkyl groups, alkyl, aralkyl groups and an aromatic ring, e.g., phenyl, thienyl and the like, $R_4$ being hydrogen when $n$ is 1 or 2, and $R_5$ represents the value described for $R_1$ above.

In the above general formulae, the alkyl moiety representing R, $R_1$, $R_2$, $R_3$, $R_4$, and $R_5$ is generally a lower alkyl group having from 1 to about 6 carbon atoms. Thus, for example suitable alkyl and substituted alkyl groups from R, $R_1$, and $R_2$ include:

| | |
|---|---|
| methyl | n-hexyl |
| ethyl | hydroxymethyl |
| n-propyl | hydroxyethyl |
| iso-propyl | hydroxypropyl |
| n-butyl | hydroxybutyl |
| iso-butyl | carboxymethyl |
| t-butyl | carboxyethyl |
| n-amyl | carboxypropyl |
| iso-amyl | and the like. |

Similarly, aralkyl radicals for R, $R_1$, $R_2$, $R_3$, $R_4$, and $R_5$ include as representative examples:

benzyl (phenyl methyl)
β-phenylethyl
β-phenylpropyl
γ-phenylpropyl, etc.

In addition, suitable oxyalkyl radicals for $R_1$ include as representative examples:

methoxymethyl
ethoxymethyl
β-methoxyethyl
β-ethoxyethyl
γ-methoxypropyl

Also, representative aromatic rings suitable for $R_4$ include phenyl and the halogen and lower alkyl substituted phenyl radicals and thienyl.

As noted above Y and $Y_1$ represent the non-metallic atoms necessary to prepare a 5- or 6-membered heterocyclic ring or an aromatic fused ring derivative thereof. Thus, with respect to the heterocyclic ammonium alkene urethanes employed as a reactant in accordance with the process of the present invention, suitable heterocyclic rings embraced by the above-described formulae include as representative examples those selected from the group consisting of those of the thiazole series (e.g., thiazole, 4-methylthiazole, 4 - phenylthiazole, 5 - methylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5 - bromobenzothiazole, 6 - bromobenzothiazole, 5-phenylbenzothiazole, 4-methoxybenzothiazole, 5 - methoxybenzothiazole, 6 - methoxybenzothiazole, 5-iodobenzothiazole, 6-iodobenzothiazole, 4-ethoxybenzothiazole, 5 - ethoxybenzothiazole, tetrahydrobenzothiazole, 5,6 - dimethoxybenzothiazole, 5,6 - dioxymethylenebenzothiazole, etc.), those of the naphthothiazole series (e.g., naphtho[1,2-]thiazole, naphtho[2,1]thiazole, 5-methoxynaphtho[2,1]thiazole, 5-ethoxynaphtho[2,1]-thiazole, 8-methoxynaphtho[1,2]thiazole, 7-methoxynaphtho[1,2]thiazole, etc.), those of the thianaphtheno-7′,6′, 4,5-thiazole series (e.g., 4′-methoxythianaphtheno-7′,6′,4, 5-thiazole, etc.), those of the oxazole series (e.g., 4-methyloxazole, 5 - methyloxazole, 4 - phenyloxazole, 4,5-diphenyloxazole, 4 - ethyloxazole, 4,5 - dimethloxazole, 5-phenyloxazole, etc.), those of the benzoxazole series (e.g., benzoxazole, 5-chlorobenzoxazole, 5-methylbenzoxazole, 6 - methylbenzoxazole, 5,6 - dimethylbenzoxazole, 4,6-dimethylbenzoxazole, 5 - methoxybenzoxazole, 5 - ethoxybenzoxazole, 5 - chlorobenzoxazole, 6 - methoxybenzoxazole, etc.), those of the naphthoxazole series (e.g., naphtho[1,2]oxazole, naphtho-[2,1]oxazole, etc.), those of the selenazole series (e.g., 4 - methylselenazole, 4 - phenylselenazole, etc.), those of the benzoselenazole series (e.g., benzoselenazole, 5-chlorobenzoselenazole series, 5-methoxybenzoselenazole, 5 - hydroxybenzoselenazole, tetrahydrobenzoselenazole, etc.), those of the naphthoselenazole series (e.g., naphtho[1,2]selenazole, naphtho[2,1]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the benzimidazole series (e.g., 1,3-diethylbenzimidazole, 1-ethyl-3-phenylbenzimidazole, etc.), those of the 3,3-dialkylindolenine series (e.g., 2,3-dimethylindolenine, 3,3,5-trimethylindolenine, 3,3,7-trimethylindolenine, etc.), those of the 2-pyridine series (e.g., pyridine, 5-methylpyridine, etc.), those of the 4-pyridine series (e.g., pyridine, etc.), etc.

Similarly, with respect to the cyclic tertiary amidinium alkene urethanes employed as a reactant in accordance with the improved process of the present invention in production of merocyanine or oxonol dyes, representative heterocyclic rings embraced by the above described general formula include those of the pyrazolone series (e.g., 3 - methyl-1-phenyl-5-pyrazolone, 1-phenyl-2-pyrazolone, 1-(2-benzothiazolyl)-3-methyl-5-pyrazolone, etc.) those of the isoxazolone series (e.g., 3-phenyl-5(4H)-isoxazolone, 3-methyl-5(4H)-isoxazolone, etc.), those of the oxidole series, (e.g., 1-alkyl-2,3-dihydro-2-oxindoles, etc.), those of the 2,4,6-triketodehexahydropyrimidine series (e.g., barbituric acid or 2-thiobarbituric acid as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di (β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc.), or 1-alkyl-3-aryl (e.g., 1-ethyl-3-phenyl, 1-n-heptyl-3-phenyl, etc., derivatives), those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2 (3H)-imidazo[1,2-α]-pyridione series, those of the 5,7-dioxo-6,7-dihydro-5-thiazolo-[3,2-α]-pyrimidine series (e.g., 5,7 - dioxo-3-phenyl-6,7-dihydro-5-thiazolo[3,4-α]pyrimidine, etc.), those of the 2-thio-2,4-oxazolidinedione series (i.e., those of the 2-thio-2,4-(3H,5H)-oxazoledione series) (e.g., 3-ethyl-2-thio-2,4-oxazolidinedione, etc.), those of the thianaphthenone series (e.g., 3(2H)-thianaphthenone, etc.), those of the 2,5-thiazolidinedione series (i.e., the 2-thio-2,5-(3H,4H)-thiazoledione series) (e.g., 3-ethyl-2-thio-2,5-thiazolidinedione, etc.), those of the 2,4-thiazolidine-dione series (e.g., 2,4-thiazolidinedione, 3-ethyl - 2,4-thiazolidinedione, 3-phenyl-2,4-thiazolidinedione, 3-α-naphthyl-2,4-thiazolidinedione, etc.), those of the thiazolidinone series (e.g., 4-thiazolidinone, 3-ethyl-4-thiazolidinone, 3-phenyl-4-thiazolidinone, 3-α-naphthyl-4-thiazolidinone, etc.), those of the 4-thiazolinone series (e.g., 2-ethylmercapto-4-thiazolinine, 2-alkylphenylamino-4-thiazolinones, 2-diphenylamino-4-thiazolinone, etc.), those of the 2-imino-2,4-oxazolinone (i.e., pseudohydantoin series, those of the 2,4-imidazolinedione(hydantoin) series (e.g., 2,4-imidazolinedione, 3-ethyl-2,4-imidazolinedione, 3-phenyl-2,4-imidazolinedione, 3-α-naphthyl-2,4-imidazolinedione, 1,3-diethyl-2,4-imidazolinedione, 1-ethyl - 3 - α - naphthyl-2,4-imidazolinedione, 1,3-diphenyl-2,4-imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3 - phenyl - 2 - thio-2,4-imidazolinedione, 3-α-naphthyl-2-thio-2,4-imidazolinedione, 1,3-diethyl-2-thio-2,4-imidazolinedione, 1-ethyl-3-phenyl-3-phenyl-2-thio-2,4 - imidazolinedione, 1-ethyl-3-α-naphthyl-2-thio - 2,4 - imidazoline, etc.), those of the 5-imidazolinone series (e.g., 2-n-propylmercapto-5-imidazolinone, etc.), etc.

As seen from the above, the heterocyclic radicals comprising a portion of the cyclic quaternary ammonium alkene urethanes and cyclic tertiary amidinium alkene urethanes employed as reactants in accordance with the improved process of the present invention are those which comprise a 5- or 6-membered nitrogenous heterocyclic ring system containing in addition to at least one nitrogen atom such other atoms including carbon, hydrogen, oxygen, sulfur, selenium etc. so as to form a heterocyclic nucleus of the type used in the synthesis of mercocyanine or oxanol dyes including those which are used as sensitizers particularly for photographic silver halide emulsions. In addition, the above exemplary materials illustrate the operable employment of the fused ring derivatives of such heterocyclic radical.

As indicated previously, the cyclic quaternary ammonium alkene urethanes or cyclic tertiary amidinium alkene urethanes employed in accordance with the improved process of the present invention in the production of cyanine dyes, i.e., carbocyanine, merocyanine, meso-substituted carbocyanine, oxanol, chain-substituted polycarbocyanine, etc., are reacted with a reactant material containing an active methylene group. Such reactants containing an active methylene group correspond generally to the formulae:

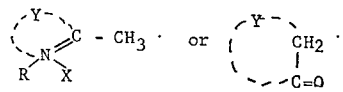

wherein R, X, and Y are as defined above with respect to the quaternary ammonium and tertiary amidinium alkene urethane reactants employed in accordance with the improved process of the present invention.

Accordingly, the reaction involved in accordance with the present invention when utilizing a cyclic quaternary ammonium N-phenyl-N-vinyl or N-polyvinylurethane reactant can be summarized as follows:

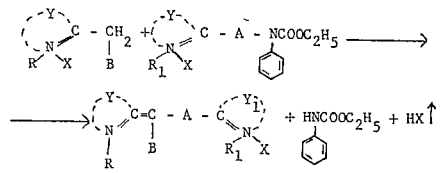

wherein A has the value given above and B is alkyl, hydrogen, lower aryl, e.g., phenyl, substituted phenyl or a heterocyclic nucleus, the latter having the configuration

in which R and $R_6$ and Y and $Y_3$, respectively, are identical with each other.

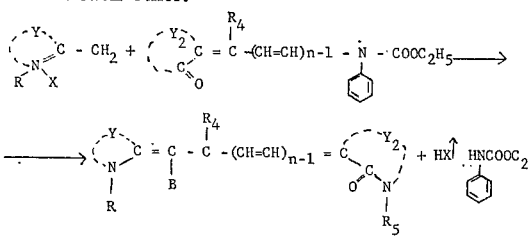

Here again, the reaction to produce the desired merocyanine dye proceeds smoothly in accordance with the present invention through the elimination of phenyl urethane.

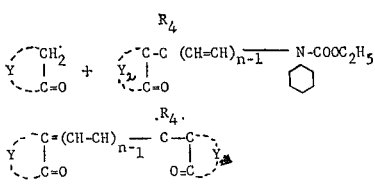

Non-limiting examples of applicable heterocyclic quaternary ammonium N-phenyl-N-vinyl or N-polyvinylurethanes employed in accordance with the improved process of the present invention include the following:
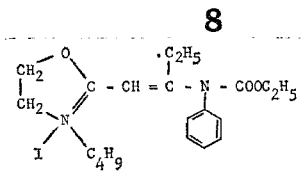
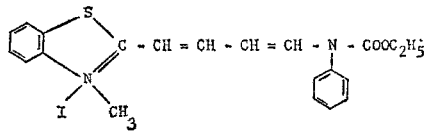
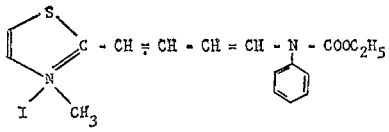
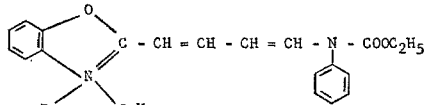
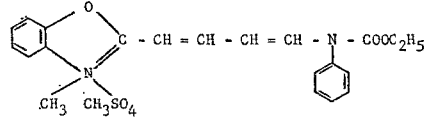
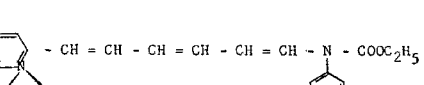
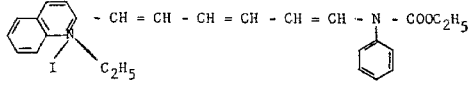
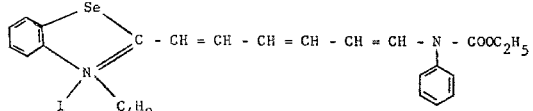
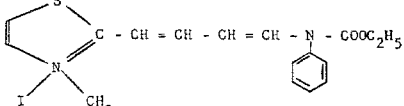
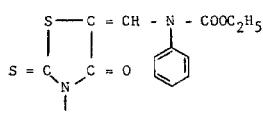
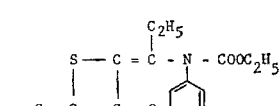
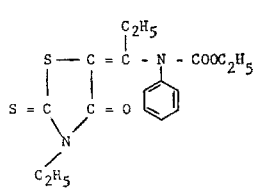
Examples are given below of ketomethylene methane intermediates:
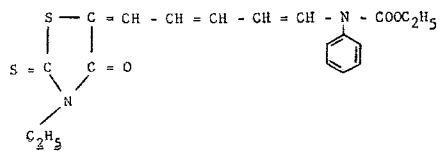

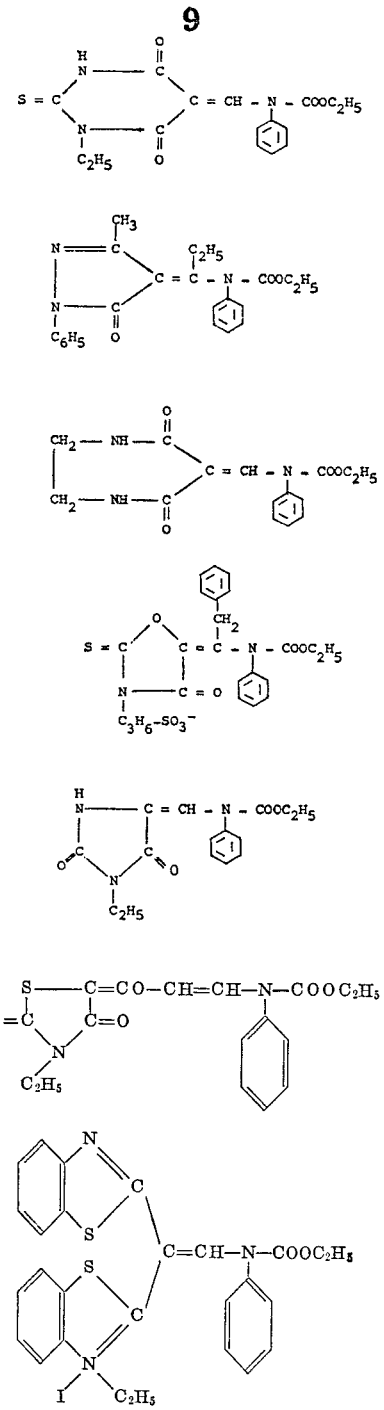

Ketomethylene urethane intermediate without nitrogen:

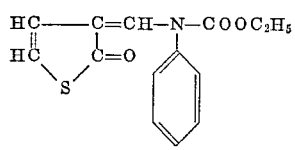

In accordance with the present invention, the desired cyanine dyes are produced in equal or better yield than produced by conventional processes and such dyes are produced in excellent purity. In fact, in some instances the dye is obtained from the reaction mixture directly in sufficient purity to pass spectrophotometric specifications. This, of course, is a distinct advantage over previously employed prior art processes. Thus, it has been shown that the urethane materials of the present invention have the capacity to condense into cyanine dyes with little, if any, side reactions as compared with the conventionally employed anilido or acetanilido intermediates, thereby resulting in the improved process of the present invention.

As indicated throughout, the use of the N-phenyl-N-vinylpolyvinyl or methylene-urethane containing reactants in accordance with the present invention comprises an improvement in the well known and conventional condensation reaction employed in the production of cyanine merocyanine and oxanol dyes. Thus, for example, conventional processes for the production of carbocyanine dyes, e.g., carbocyanine, merocyanine, oxanol, can be found throughout the patent literature, particularly U.S. Pats. 1,934,657, 1,934,659, 1,935,696, 1,950,876, 1,969,444, 1,994,563, 2,072,908, 2,107,379, 2,108,485, 2,120,322, 2,161,331, 2,170,803, 2,170,807, 2,177,401, 2,177,403, 2,213,238, 2,213,995, 2,231,658, 2,233,509, 2,238,231, 2,263,757, 2,319,547, 2,503,776, 2,609,371, 2,719,151, 2,739,964, and 2,856,404, for example.

In accordance with the improved process of the present invention, the condensation of an active methyl or methylene group containing reactant and an N-phenyl-N-vinyl, polyvinyl or methylene urethane containing reactant, i.e., cyclic quaternary ammonium vinyl or polyvinyl urethane or cyclic tertiary amidinium alkyleneurethane is generally accelerated by the employment of basic condensing agents, such as the trialkyl amines (trimethylamine, triethylamine, tri-n-propylamine, triisopropylamine, tri - n - butylamine, etc.), N,N-lower dialkylaniline (e.g., N,N-dimethylaniline, N,N-diethylaniline, etc.), piperidine, N-alkylpiperidine (e.g., N-methylpiperidine, N-ethylpiperidine, etc.), the lower alkali metal alkylates (e.g., sodium methylate, potassium ethylate, lithium propylate, etc.).

The dye condensation reaction also can be advantageously carried out in the presence of an inert diluent, e.g., pyridine. In addition, other suitable diluents which can be employed in addition to or in place of the conventionally employed pyridine include lower alkanols such as ethanol, n-propanol, isopropanol, n-butanol, etc., also dimethyl formamide, quinoline, 1,4-dioxane, etc.

Generally, such condensation reactions in the production of cyanine dyes are carried out under temperatures varying from below ambient temperature (ca. 25° C.) to the reflux temperature of the reaction mixture. Thus, suitable temperatures employed in the condensation reaction of the active methylene containing compound and the alkene urethane reactant varies from about 20° to 100° C., depending, of course, on the dye being produced.

As in the conventional processes for the production of cyanine dyes after the reaction has proceeded for a substantial period of time, i.e., for about an hour, the reaction mixture is either chilled or drowned in an appropriate diluent to obtain the dye which is subsequently purified by conventional means.

While the above discussion of the improved process of the present invention has been based primarily upon the use of the pre-formed cyclic quaternary ammonium alkene urethane or cyclic tertiary amidinium alkylene urethane reactant, it is similarly within the scope of the present invention to provide a process utilizing the in situ formation of such intermediate reactants. Such a process involving the in situ formation of the alkene urethane reactant involves the employment of ethyl chloroformate and a conventional anilino-alkylene intermediate reacted with an active methyl compound in the production of the desired cyanine dye.

Thus, in conventional processes of producing cyanine dyes, e.g., carbocyanine dyes, etc., acetic anhydride is reacted with an anilino alkylene intermediate to produce a reactant which when reacted with the active methyl or methylene containing compound forms the desired dye. Such a reaction, as illustrated previously, results in the elimination of acetanilide and similar simple materials.

In accordance with the improved process of the present invention, however, the substitution of ethyl chloroformate for acetic anhydride results in the in situ formation of the alkene urethane reactant which further reacts with the active methyl containing compound to produce the desired cyanine dye. The conventional anilino alkylene intermediates employed in this reaction of the present invention include compounds of the following general formulae:

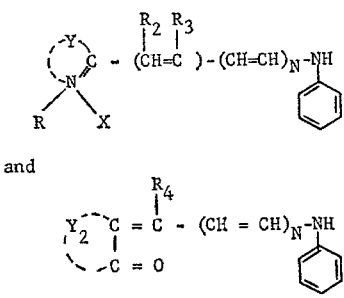

and wherein R, $R_1$, $R_4$, $R_5$, X, Y, and $Y_2$, and $n$ have the values designated previously.

Thus, suitable anilinoalkylene intermediate compounds which can be employed in accordance with this embodiment of the present invention wherein the alkene urethane reactant is produced in situ can comprise any and all of the precursors of the cyclic quarternary ammonium vinyl or polyvinyl urethanes and cyclic tertiary amidinium alkylene urethanes described above.

Here again, as with the use of the pre-formed intermediate, the reaction conditions including use of basic condensing catalysts and inert diluents are the same as those conventionally employed in the production of carbocyanine and related dyes.

In this respect, it is again pointed out that the present invention comprises an improvement associated with a conventional anilinoalkylene process of producing cyanine merocyanine and oxanol dyes. Thus, the improvement of the present invention comprises the utilization of an N-phenyl-N-vinyl urethane intermediate or an in situ prepared N-phenyl-N-vinyl urethane intermediate which through reaction with an active methyl containing compound will provide the desired dyestuff with minimum objectionable side reactions due to fragmentation, multiple condensation or decomposition associated with the use of conventional acetylanilino alkylene intermediates.

The process of the present invention will now be described by reference to the following specific examples. It is to be understood, however, that such examples are presented for purposes of illustration only, and the present invention is in no way to be deemed as limited thereto.

EXAMPLE I

Preparation of 1-ethyl-2-($\beta$-phenylurethanylvinyl)-3,3,5-trimethyl indoleninium iodide 1-ethyl - 2 - ($\beta$-anilinovinyl)-3,3,5-trimethyl indolenium iodide (13 g.=.03 mole) was dissolved in pyridine (50 ml.) and ethyl chloroformate (4 ml.=.05 mole) was added portionwise with stirring and cooling. The reaction was then heated on a steam bath for five minutes, cooled and diluted with ether (200 ml.). The solvent liquor was decanted from the residual oil and the oil triturated with ether. After separating the wash ether, the oil was dissolved in ethanol (50 ml.) and chilled for several hours with occasional trituration. The separated solids were collected by filtration and washed with ether on the filter. The orange-yellow crystals were purified by recrystallization from isopropanol-ether mixture 1:1, the melting point of a twice recrystallized product was 148–150° C. with decomposition.

*Analysis.*—Calc. (percent): C, 57.15; H, 5.80; N, 5.55; I, 25.16. Found (percent): C, 57.06; H, 5.87; N, 5.38; I, 25.47.

EXAMPLE II

Preparation of 2-[$\delta$(1-ethyl-3,3,5-trimethyl-2-indoleninylidene)propenyl] - 1' - (2 - acetoxypropyl)-6'-chloro-3'-ethylbenzimidazolium perchlorate with use of isolated urethane intermediate of Example I 1-ethyl-2-($\beta$-phenylurethanyl vinyl)3,3,5-trimethyl indoleninium iodide (1.5 g.=.003 mole) and 3-($\beta$-acetoxypropyl)-5-chloro-1-ethyl-2-methyl benzimidazolium iodide (1.4 g.=.003 mole) were dissolved in 10 ml. dimethyl formamide and treated with 1 ml. triethylamine. After heating on a steam bath for 40 minutes the reaction liquor was poured into a solution of 50 ml. water containing 1 gram of sodium perchlorate. The residual gum was dissolved in 10 ml. of methanol, chilled for several hours and the red dye collected and washed with cold methanol. The dye had the structure:

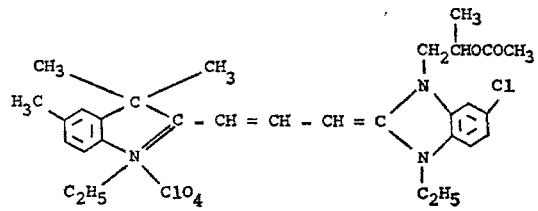

EXAMPLE III

In situ production of 2-[$\gamma$-(1-ethyl-3,3,5-trimethyl-2-indoleninylidene)propenyl] - 1' - (2 - acetoxypropyl)-6'-chloro-3'-ethylbenzimidazolium perchlorate 1-ethyl-2-($\beta$-anilino vinyl)-3,3,5-trimethyl indolenium, iodide (26 g.=.06 mole) was placed in a flask with dimethyl formamide (150 ml.) and pyridine (8 ml.). Ethyl chloroformate (8 ml.=.08 mole) was added portionwise with stirring at room temperature and the resulting mixture heated on a steam bath for several minutes. 3-($\beta$-acetoxypropyl)-5-chloro-1-ethyl-2-methyl benzimidazolium iodide (28 g.=.066 mole) was then added followed by triethylamine (20 ml.=.145 mole) and the reaction heated at 90° C. for one hour. The mixture was then poured into a solution of water (800 ml.) containing sodium perchlorate (16 g.), chilled and the residual gum triturated several times with hot water. The gum was then dissolved in hot methanol (200 ml.), chilled and the solid dye collected by filtration and washed with cold methanol, then ether and dried. The yield of dye was 22.3 g. (61.5% of theory) with a melting point of 195–205° C. This dye was identical with that produced in Example II.

The dyes of Examples II and III were identical with the dye prepared by the conventional method which utilizes acetic anhydride in place of ethyl chloroformate. The yield of dye prepared by the conventional method averages only 30–40% and is contaminated by difficult to remove by-products of reaction. The ethyl chloroformate method not only gives vastly improved yields but also results in a drastic reduction of undesirable side reactions, thereby producing a much cleaner product.

EXAMPLE IV

Preparation of 2-[$\gamma$-(3-methyl-2-thiazoleninylidene)propenyl] - 1' - (2-acetoxypropyl)-6'-chloro-3'-ethylbenzimidazolium iodide 2-($\beta$-anilinovinyl)-3-methyl thiazolinium iodide (10.4 g.=.03 mole) was placed in a flask with pyridine (60 ml.) and ethyl chloroformate (5 ml.=.05 mole) added portionwise with cooling and stirring. After stirring an additional 10 minutes at room temperature, 3-($\beta$-acetoxypropyl)-5-chloro-1-ethyl-2-methyl benzimidazolium iodide (14 g.=.033 mole) was added followed by triethylamine (10 ml.=.07 mole) and the reaction heated under reflux for 1½ hours. After chilling for several hours the dye was collected and washed with a small amount of cold acetone, then cold water until the washings ran clean. The yield of dye was 8.3 g. (50.5% of theory) with a melting point of 204–8° C.

*Analysis.*—Calc. (percent): C, 45.11; H, 4.98; N, 7.67; S, 6.33. Found (percent): C, 45.13; H, 5.17; N, 7.38; S, 6.25.

The dye had the structure:

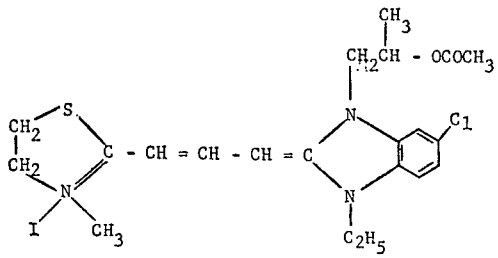

EXAMPLE V

Preparation of 2-[γ-(3-ethyl-5,6-dioxymethylene-2-benzothiazoleninylidene) - Δ - (β,Δ - pentadienyl]-6'-diethylamino-3'-ethylbenzothiazolium iodide 2 - acetylmethylene - 5,6-methylenedioxy-3-ethyl-2,3-dihydrobenzothiazole (5.8=.022 mole) and phenoxyethyl-p-toluenesulfonate (11.0 g.=.042 mole) were heated together at 115–120° C. for one hour, cooled and dissolved in isopropanol (125 ml.). To the resulting solution was added, 2 - (β-anilinovinyl)-3-ethyl-6-triethylaminobenzothiazolium di-iodide (9 g.=.014 mole) followed by ethyl chloroformate (10 ml.=.015 mole) with 5 minute stirring and triethylamine (25 ml.=.178 mole). The resulting mixture was stirred at room temperature for 10 minutes, heated to reflux for 2 minutes, then chilled and the dye collected, washed with isopropanol followed by ether and dried. The crude dye was boiled out in water (60 ml.), filtered hot and washed with isopropanol and ether. The yield of dye was 6.7 g. (62% of theory) with a melting point of 212–213° C.

*Analysis.*—Calc. (percent): C, 56.17; H, 5.24; N, 5.46; I, 16.49. Found (percent): C, 56.47; H, 5.39; N, 5.15; I, 15.87.

The dye had the structure:

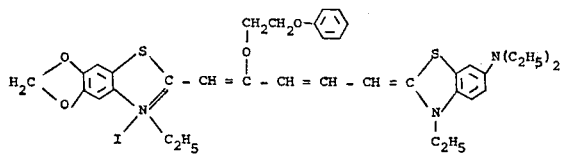

EXAMPLE VI

Preparation of 3-carboxymethyl-5-(β-[3'-ethyl-2'(3'H)-thiazolenylidene]-ethylidene)rhodanine 2-(β-anilinovinyl) - 3 - ethyl thiazolinium iodide (3.6 g.=.01 mole) was placed in a flask with dimethylformamide (25 ml.) and pyridine (3 ml.) Ethyl chloroformate (1 ml.=.01 mole) was added with stirring and the resulting solution heated on a steam bath for several minutes. 3-carboxymethyl rhodanine (1.9 g.=.01 mole) was then added followed by sodium methoxide (1.6 g.=.03 mole) and the reaction heated on a steam bath for 10 minutes. After drowning in a mixture of water (100 ml.) and hydrochloric acid (10 ml.), the resulting oil was solidified by chilling and scratching. The solids were filtered off and dissolved in methanol (40 ml.) by the addition of ammonium hydroxide (3 ml.). The resulting solution was treated with charcoal, filtered, and acidified by the addition of 6 N hydrochloric (10 ml.). After chilling, the solids were collected by filtration, washed with 50 ml. of a 1—1 mixture of methanol and ethyl ether and dried. The yield of desired dye was 2.0 g. (60.5% of theory) with a melting point of 233–5° C.

*Analysis.*—Calc. (percent): C, 43.62; H, 4.27; N, 8.48; S, 29.09. Found (percent): C, 43.67; H, 4.49; N, 7.63; S, 29.92.

The dye had the structure:

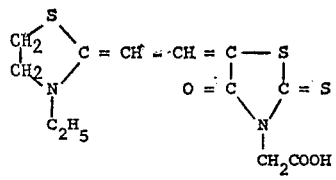

EXAMPLE VII

Preparation of 2-[γ-(3-ethylbenzoselenazolinylidene) propenyl]-3'-ethylbenzoselenazolium iodide 3-ethyl - 2 - methylbenzoselenazolium iodide (7.3 g.=0.2 mole) was placed in a flask with dimethylformamide (30 ml.) followed by diphenylformamidine (2.0 g.=.01 mole) and pyridine (2 ml.). Ethyl chloroformate (3 ml.=.03 mole) was added with stirring, and after five minutes triethylamine was added (5 ml.=.035 mole). The reaction was heated on a steam bath for 20 minutes and poured into water (200 ml.). After filtration the damp filter cake was boiled out in methanol (30 ml.) two times. The yield of desired dye was 1.2 g. (20%) with a melting point of 279–80° C. with decomposition.

*Analysis.*—Calc. (percent): C, 43.02; H, 3.61; N, 4.78; I, 21.65. Found (percent): C, 41.95; H, 3.68; N, 4.51; I, 23.97.

The dye had the structure:

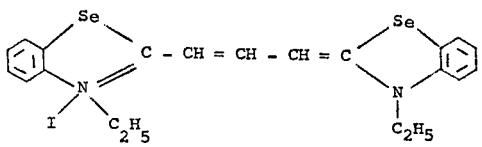

EXAMPLE VIII

Preparation of 2-[γ-(3-ethylbenzothiazolinylidene) propenyl]-3'-ethylbenzothiazolium iodide 3-ethyl-2-methyl benzothiazolium iodide (2.1 g.=.01 mole) was placed in a flask with dimethylformamide (25 ml.) and diphenylformamidine (1.0 g.=.005 mole). After heating on a steam bath for 5 minutes, the solution was cooled and ethyl chloroformate (1.0 ml.=.01 mole) was added. After 5 minutes standing 2.5 ml. (0.0175) mole) of triethylamine was added and the mixture heated on a steam bath for 20 minutes. The reaction was drowned in cold water (150 ml.) and the solids collected by filtration. The crude dye was dissolved in acetonitrile (2.5 ml.) and diluted with ethyl ether (25 ml.). The resulting steel-blue needles melted at 274–5° C. with decomposition.

*Analysis.*—Calc. (percent): C, 51.22; H, 4.30; N, 5.69; I, 25.78; S, 13.01. Found (percent): C, 48.96; H, 4.38; N, 5.34; I, 24.58; S, 12.06.

The dye had the structure:

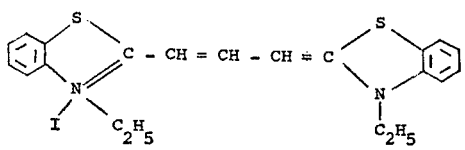

EXAMPLE IX

Preparation of 2-[γ - (3 - ethyl - 5 - phenylbenzoxazolinylidene)-β-ethylpropenyl]-3'-ethylbenzothiazolium iodide 3-ethyl-2-(β-[N-ethyl-4-chloroanilino vinyl]-5 - phenylbenzoxazolium iodide (5.3 g.=.01 mole) was placed in a flask with n-propanol (25 ml.) and pyridine (5 ml.). Ethyl chloroformate (2.0 ml.=.02 mole) was added with stirring and allowed to stand for several minutes. 3-ethyl-2-methylbenzothiazolium iodide (3.1 g.=.01 mole) was then added followed by triethylamine addition (5.0 ml.) and heated on a steam bath for 1¼ hours. Filtered from insolubles, the filtrate was chilled for several hours. Solids were collected by filtration and washed with n-propanol and ether. Melting point of product was 258–60° C.

The dye had the structure:

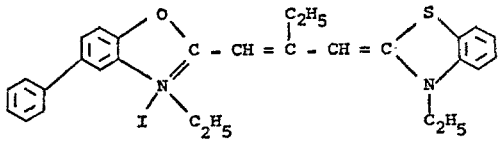

EXAMPLE X

The preparation of 2-[γ-(1-β-acetoxypropyl-6 - chloro - 3- ethylbenzothiazolinylidene)-propenyl] - 1' - β - acetoxy-propyl-6'-chloro-3'-ethylbenzothiazolium iodide This dye was prepared by reacting 2 moles of 3-(β-acetoxypropyl)-5-chloro-1-ethyl - 2 - methylbenzimidazolium iodide and 1 mole of diphenylformamidine in dimethylformamide with ethyl chloroformate (1 mole) in the presence of sodium methoxide (2 moles). The dye was isolated in a manner similar to Example I.

The dye had the structure:

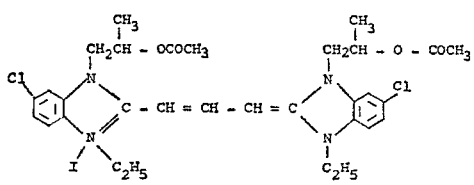

EXAMPLE XI

Preparation of 2-[3-(2-[3 - benzyl - 4 - methyl]thiazolyl) propenylidene]-6-chloro-3-methylbenzoxazolium iodide 2-(β-anilinovinyl - 6 - chloro - 3 - methylbenzoxasolium iodide (124 g.=.30 mole) was placed in a flask with dimethylformamide (600 ml.) and pyridine (40 ml.). Ethyl chloroformate (54 ml.–.56 mole) was added portionwise with cooling. After stirring for 5 minutes 3-benzyl 2,4-dimethylthiazolium bromide (88 g.–.31 mole) was added followed by triethylamine (100 ml.). The reaction was heated at 125° C. for 15 minutes and chilled for several hours. The reaction was heated at 125° C. for 15 minutes and chilled for several hours. The dye was collected by filtration and washed with a water-pyridine mixture 1:1, then boiled out twice in methanol. The yield of pure dye was 127 g. (81% of theory) with a melting point of 262–3° C.

*Analysis.*—Calc. (percent): C, 50.54; H, 3.85; N, 5.35; S, 6.13. Found (percent): C, 51.74; H, 3.96; N, 5.32; S, 7.03.

The dye had the structure:

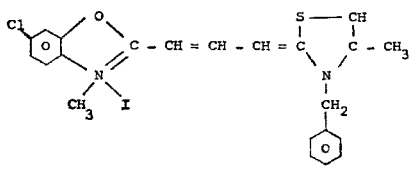

EXAMPLE XII

Preparation of oxanol dye

Malonaldehyde dianil monohydrochloride (2.6 g.=.01 mole) was placed in a flask with pyridine (30 ml.) and ethyl chloroformate (1 ml.=.01 mole) added slowly with cooling and stirring. 1-(p - sulphophenyl) - 3 - methyl - 5-pyrazolone (5.0 g.=.02 mole) was then added followed by dimethylformamide (10 ml.). The reaction was heated under reflux for 1 hour, cooled and poured into benzene (200 ml.). The resultant gum was triturated several times with acetone (50 ml.) and then dissolved in hot acetic acid (75 ml.). Hydrochloric acid (3 ml.) was added and the dye crystallized out. After cooling, the dye was collected by filtration and washed with acetone. The yield of dye after several methanol boilouts was 3.3 g. (69% of theory). This dye is identical with an authentic sample prepared by a conventional method.

The dye had the structure:

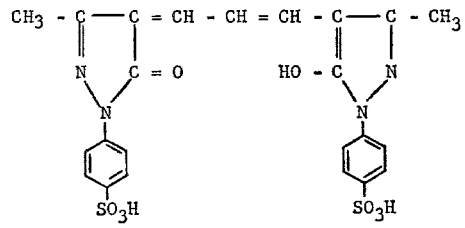

EXAMPLE XIII

Example XII was repeated with the exception that the 2.6 g. of malonaldehyde dianil monohydrochloride was replaced by 2.9 g. of glutaconaldehyde dianil monohydrochloride was replaced by 2.9 g. of glutaconaldehyde dianil monohydrochloride. A dye having the following structure was obtained:

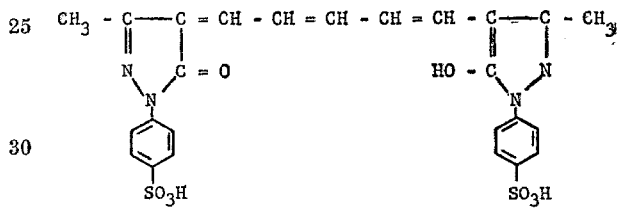

EXAMPLE XIV 5-anilino methylene-2-allyl rhodanine (2.4 g.=.005 mole) was placed in a flask with methanol (25 ml.) and pyridine (3 ml.). Ethyl chloroformate (1 ml.) was added and the reaction heated to reflux on a steam bath. 2-methyl benzothiazole, ethyl iodide (1.5 g.=.005 mole) was then added followed by triethylamine (3 ml.). After refluxing for 4 hours, the reaction was filtered hot and the crystalline crude dye washed with methanol. The dye was then boiled out 3 times with 15 ml. methanol, filtered hot each time, finally the dye was digested on a steam bath in 15 ml. methyl Cellosolve, filtered and washed with methanol. Yield=1 g. of blue-green needles M.P.—229–30° C. spectrophotomeiric absorption peak occurs at 523 MW. The dye has the following structure:

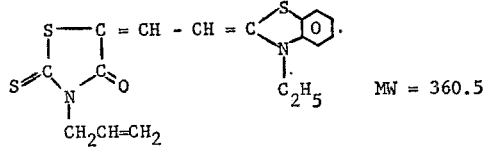

and is identical with this dye made in a conventional manner.

Many of the dyes produced in accordance with the process of the present invention are particularly useful for inclusion as sensitizers for photographic silver halide emulsions, in filter and antihalation layers, and as optical sensitizers for electrophotographic materials. In this regard, dyes produced in accordance with the present invention are particularly applicable because in many instances by employing the improved process of the present invention, it is possible to directly produce photographic grade dyes. This, of course, is a distinct advantage over previously employed processes which have involved considerable purification techniques to produce dyes useful in photographic emulsions and other reprographic elements.

Sensitization of the dyes employed in accordance with the process of the present invention is directed frequently to the ordinarily employed gelatino-silver halide emulsions. The dyes are advantageously incorporated in the washed, finished emulsion and should, of course, be uniformly distributed throughout the emulsion. In the preparation of photographic emulsions containing the dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials.

The concentration of the dyes when used as sensitizers in the emulsion can vary widely, i.e., from about 5 to about 100 mgs. per liter of flowable emulsion. The concentration of the dye will vary according to the type of actinic radiation-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with dyes produced in accordance with the present invention, the following procedure is satisfactory: A quantity of the dye may be dissolved in ethanol or other suitable solvent and a volume of this solution containing from 5 to 100 mgs. of dye is slowly added to about 1000 cc. of a gelatino-silver-halide emulsion, with stirring. Stirring is continued until the dye is uniformly distributed throughout the emulsion. With many of the dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

Photographic silver halide emulsions which can advantageously be sensitized by means of the dyes produced in accordance with the process of the present invention comprise the customarily employed gelatino-silver-chloride, gelatino silver chlorobromide, gelatino-silver-bromide, and gelatino-silver bromiodide developing-out emulsions.

Photographic silver halide emulsions, such as those listed above, containing the sensitizing dyes of the present invention can also contain such addenda as chemical sensitizers, e.g., sulfur sensitizers (e.g., allylthiocarbamide, thiourea, allylisothiocyanate, cystine, etc.), various gold compounds (e.g., potassium chloroaurate, auric thichloride, etc.) (see U.S. Pats. 2,540,085; 2,597,856 and 2,597,915), various palladium compounds, such as palladium chloride (U.S. 2,540,086), potassium chloropalladate (U.S. 2,598,079), etc., or mixtures of such sensitizers; anti-foggants, such as ammonium chloroplatinate (U.S. 2,566,245), ammonium chloroplatinite (U.S. 2,566,263), benzotriazole, nitrobenzimidazole, 5-nitroindazole, benaidine, mercaptans, etc. (see Mees—"The Theory of the Photographic Process," Macmillan Pub., 1942, p. 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Pat. 2,423,730, Spense and Carroll, U.S. Pat. 2,640,776, etc.; or mixtures of such addenda. Dispersing agents for color couplers, such as those set forth in U.S. Pats. 2,322,027 and 2,304,940, can also be employed in the above described emulsions.

As can be seen from the above, therefore, the present invention comprises an improved process for the production of conventional cyanine dyes, e.g., carbocyanine, merocyanine, oxanol and related dyes. Thus, in accordance with the present invention, an improved process has been developed by which higher yields of higher purity dyes can be provided, some of which, as noted above, being directly useable in photographic silver halide emulsions without further purification.

While the present invention has been described primarily with respect to the foregoing specific examples, it is to be understood that the present invention is in no way to be deemed as limited thereto, but must be construed as broadly as all or any equivalents thereof.

I claim:

1. A process for the production of a cyanine dye comprising condensing an active methyl containing compound of the formula:

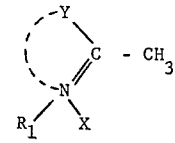

wherein $R_1$ is selected from the group consisting of alkyl, substituted alkyl, allyl heterocycloalkyl, and aralkyl groups of the type usual in cyanine dyes; X is an anion of the type usual in cyanine dyes; and Y represents the atoms necessary to complete a heterocyclic ring of the type usual in cyanine dyes;

with an intermediate of the formula

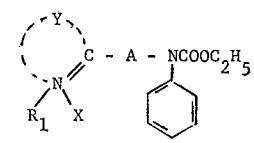

wherein A has the structure

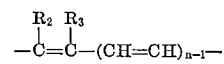

wherein $R_2$ is selected from the group consisting of hydrogen, lower alkyl, aryl, aryloxy and arylthio groups, and $R_3$ is selected from the group consisting of hydrogen, lower alkyl and aryl groups, at least one of $R_2$ and $R_3$ being hydrogen and $n$ is an integer from 1 to 3, $R_3$ being hydrogen when $n$ is greater than 1; and $R_1$, X, and Y being as defined above.

2. The process of claim 1 wherein said process is conducted at a temperature within the range of ambient room temperature to the reflux temperature of the reaction mixture.

3. A process for the production of a merocyanine dye comprising condensing an active methyl containing compound of the formula:

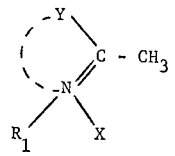

where $R_1$ is selected from the group consisting of alkyl, substituted alkyl, allyl, heterocycloalkyl and aralkyl groups of the type usual in cyanine dyes; X is an anion of the type usual in cyanine dyes and Y represents the atoms necessary to form a heterocyclic ring of the type usual in cyanine dyes; with an intermediate of the formula:

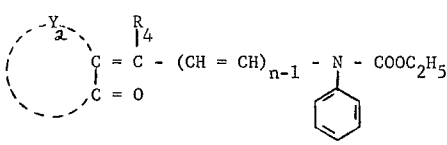

wherein $Y_2$ represents the atoms necessary to complete a heterocyclic nucleus of the type usual in merocyanine dyes, $R_4$ is selected from the group consisting of hydrogen, lower alkyl, lower hydroxyalkyl, lower carboxyalkyl, lower alkoxyalkyl, allyl and aralkyl groups, and $n$ is an integer from 1–3, $R_4$ being hydrogen when $n$ is greater than 1.

4. The process of claim 3 wherein said process is conducted at a temperature within the range of ambient room temperature to the reflux temperature of the reaction mixture.

5. A process for the production of a cyanine dye comprising:

(I) reacting (a) ethyl chloroformate and (b) a compound of the formula:

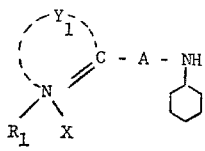

wherein $R_1$ is selected from the group consisting of alkyl, substituted alkyl, heterocycloalkyl and aralkyl groups of the type usual in cyanine dyes; X is an anion of the type usual in cyanine dyes; $Y_1$ represents the atoms necessary to form a heterocyclic ring of the type usual in cyanine dyes; and —A— has the structure

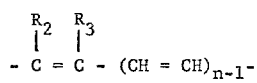

wherein $R_2$ is selected from the group consisting of hydrogen, lower alkyl, aryl, aryloxy and arylthio groups, and $R_3$ is selected from the group consisting of hydrogen, lower alkyl and aryl groups, at least one of said $R_2$ and $R_3$ being hydrogen; and $n$ is an integer from 1 to 3, $R_3$ being hydrogen when $n$ is greater than 1; and (II) without isolation of the reaction product of I, reacting the product of I with an active methyl containing compound of the formula:

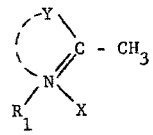

wherein $R_1$, X and Y are as defined above.

6. The process of claim 5 wherein said process is conducted at a temperature within the range of room temperature to the reflux temperature of the reaction mixture.

7. A process for the production of a merocyanine dye comprising:

(I) reacting (a) ethyl chloroformate and (b) a compound of the formula:

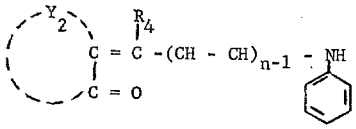

wherein $Y_2$ represents the atoms necessary to complete a heterocyclic nucleus of the type usual in merocyanine dyes; $R_4$ is selected from the group consisting of hydrogen, lower alkyl, lower hydroxyalkyl, lower carboxyalkyl, lower alkoxyalkyl, allyl and aryl groups, and $n$ is an integer from 1–3, $R_4$ being hydrogen when $n$ is greater than 1, and (II) without isolation of the reaction product of I, reacting the product of I with an active methyl containing compound of the formula:

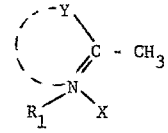

wherein $R_1$ is selected from the group consisting of lower alkyl, substituted alkyl, allyl, heterocycloalkyl and aralkyl groups of the type usual in cyanine dyes; X is an anion of the type usual in cyanine dyes; and Y represents the atoms necessary to complete a heterocyclic ring of the type usual in cyanine dyes.

8. The process of claim 7 wherein said process is conducted at a temperature within the range of room temperature to the reflux temperature of the reaction mixture.

9. A process for the production of an oxonol dye which comprises condensing an active methylene compound of the formula:

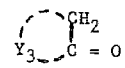

wherein $Y_3$ represents the atoms necessary to form a heterocyclic ring with an intermediate of the formula:

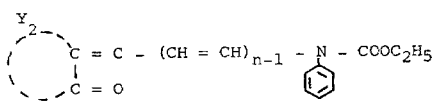

wherein $R_4$ is selected from alkyl, aryl or aralkyl; $n$ is 1, 2, or 3; $R_4$ is hydrogen when $n$ is 2 or 3; $Y_2$ represents the atoms necessary to form a heterocyclic ring; and $R_5$ is alkyl, substituted alkyl, allyl, aryl or aralkyl.

References Cited

UNITED STATES PATENTS 2,553,494   5/1951   Anish _____ 260—240.4

OTHER REFERENCES

Hamer, "The Cyanine Dyes and Related Compounds," Interscience, New York (1964), pp. 105, 6, 18 and 19.

HENRY R. JILES, Primary Examiner

G. T. TODD, Assistant Examiner

U.S. Cl. X.R.

260—240 R, 240.2, 240.4, 240.6, 240.65